United States Patent [19]
Laama et al.

[11] 3,757,670
[45] Sept. 11, 1973

[54] EXPRESSO COFFEEMAKER

[75] Inventors: Vello Laama, Lombard; Robert Donald Grahn, Hinsdale, both of Ill.

[73] Assignee: Sunbeam Corporation, Chicago, Ill.

[22] Filed: Feb. 10, 1972

[21] Appl. No.: 225,153

[52] U.S. Cl. ................................................ 99/302
[51] Int. Cl. ............................................ A47j 31/10
[58] Field of Search ..................... 99/302, 303, 281, 99/282, 283

[56] References Cited
UNITED STATES PATENTS

| | | | |
|---|---|---|---|
| 3,285,158 | 11/1966 | Price | 99/281 |
| 3,280,303 | 10/1966 | Krauss | 99/310 |
| 2,856,842 | 10/1958 | Schwaneke | 99/310 |

FOREIGN PATENTS OR APPLICATIONS

| | | | |
|---|---|---|---|
| 359,859 | 10/1958 | Switzerland | 99/303 |

Primary Examiner—Robert W. Jenkins
Attorney—George R. Clark

[57] ABSTRACT

A two vessel electric coffeemaker wherein water is forced from the lower vessel through a coffee container to the upper vessel so that the percolate is collected in the upper vessel is provided. A C-shaped electrical heating element is integrally formed with the base of the lower vessel to provide energy for the generation of steam. The steam provides the necessary pressure for forcing the percolate into the upper vessel. Once the coffee has percolated it is kept warm by a thermostatic switch that is positioned inside the C-shaped heating element in contact with the base of the lower vessel.

11 Claims, 4 Drawing Figures

Patented Sept. 11, 1973
3,757,670
2 Sheets-Sheet 1
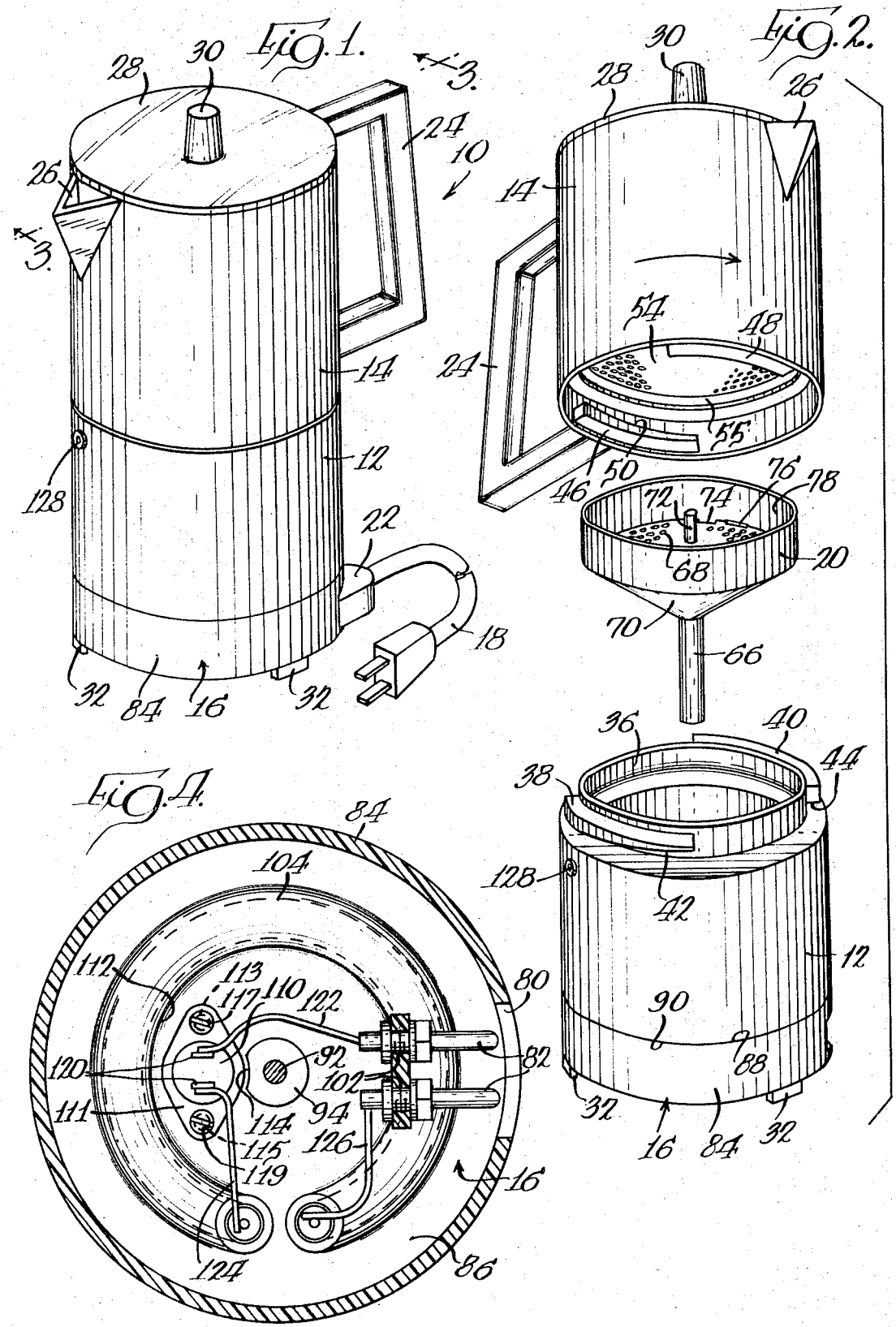

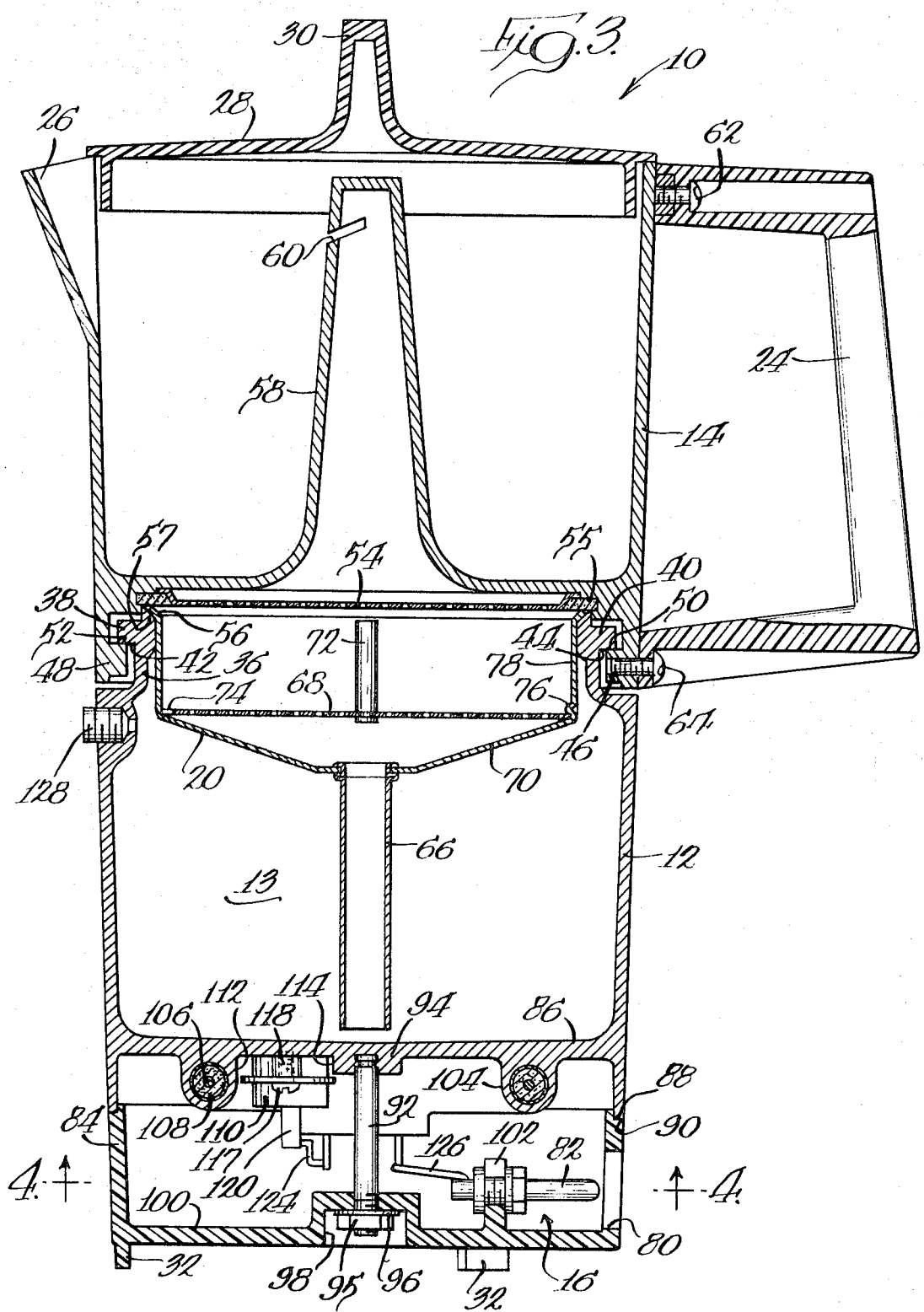

EXPRESSO COFFEEMAKER

BACKGROUND OF THE INVENTION

The present invention relates to pressure-type coffeemakers, especially those which are suitable for preparing expresso coffee. These coffeemakers are constructed with a lower vessel having a water-containing section into which the proper amount of water is poured and an upper vessel which is secured to the lower vessel. A container for holding coffee grounds is located in a passageway intermediate the upper and lower vessels. A pipe extends upwardly into the container from the lower chamber so that steam pressure generated in the lower chamber can force water up from the lower vessel into contact with the coffee grounds in the coffee container. A second pipe extends upwardly into the upper vessel whereby the percolate liquid which is forced through the coffee grounds is supplied to the upper vessel for storage. The coffeemaker also contains a plurality of parallel and perforated discs or diaphrams which are used to filter out coffee grounds from the percolate.

Coffeemakers of the described type have been generally heated by an external source of heat such as a gas burner or a stove. Under modern living conditions it is not desirable to require that an external source of heat be provided to heat a coffeemaker because of the convenience of electricity. Electrical pressure-type coffeemakers have previously been developed. For example, an electric pressure-type coffeemaker is shown in Great Britain Patent No. 976,601, complete specification published Dec. 2, 1964 on an application of Cesare Albertini. In this coffeemaker, as in other prior coffeemakers of the type described, the heating element extends directly into the water in the lower vessel. When the heating element is inserted directly in the water in the lower vessel mineral deposits may build up and they can adversely affect the taste of the coffee. In addition there is likely to be an increased safety hazard with such an arrangement.

It is, therefore, desirable to provide a coffeemaker of the two vessel pressure type with a single C-shaped electric heating element which does not extend into the water in the lower vessel but which is instead formed integrally with the base of the water-containing section of the lower vessel. In such a coffeemaker it is always necessary to protect against overheating of the coffeemaker when it is used with an insufficient supply of water. In addition, it is also desirable to keep the coffee liquid in the upper vessel warm at a substantially predetermined temperature once the coffee has been prepared. The latter object is especially desirable if it can be achieved without substantially increasing the cost of the coffeemaker.

In order to perform both of these functions the present invention employs a single bi-metallic thermostatic switch which is placed in contact with the underside of the base of the lower vessel. The positioning of this switch is of importance since the thermostat is to perform a keep-warm function as well as to provide for overheating protection. It has been found that the desired type of operation is achieved when the thermostatic switch is placed inside the C-heating element between the inner periphery of the C-shaped heating element and a circular mounting boss that is located at the center of the base of the lower vessel.

The coffee container has a funnel-shaped lower surface. In order to insure that this portion of the coffee container can be cleaned adequately, the filter disc for the coffee container is provided with provisions for releasably securing the filter disc over the funnel-shaped lower surface of the coffee container.

It is an object of the present invention to provide an electric coffeemaker of the two vessel pressure-type wherein the heating element is integrally formed with the base of the water-containing portion of the lower vessel.

It is another object of the present invention to provide an electric coffeemaker of the pressure-type with an electric heating mechanism that protects the coffeemaker against overheating and also functioning to keep the brewed coffee warm.

It is a further object of the present invention to provide an electric coffeemaker of the two vessel pressure-type having a C-shaped heating element integrally formed with the base of the water-containing section of the lower vessel and a thermostatic switch positioned inside the C-shaped heating element in contact with the base of the water-containing section to provide overheating protection and keep-warm features.

It is an additional object of the present invention to provide a coffee container for a coffeemaker which comprises a funnel-shaped outlet surface, a filter disc with a handle and provisions for releasably securing the filter disc over the funnel-shaped surface.

DESCRIPTION OF THE DRAWINGS

FIG. 1 is a perspective view of the coffeemaker of the present invention;

FIG. 2 is a perspective assembly drawing of the coffeemaker showing the assembled relationship of the upper and lower vessel and the container for the coffee grounds;

FIG. 3 is a cross sectional view of the coffeemaker taken along the lines 3—3 of FIG. 1;

FIG. 4 is a cross sectional view of the heating section of the coffeemaker taken along the lines 4—4 of FIG. 3.

TECHNICAL DESCRIPTION OF THE INVENTION

The coffeemaker of the present invention designated generally by the reference numeral 10 shown in FIG. 1. The coffeemaker 10 is constructed of a lower vessel 12 and an upper vessel 14 which are releasably interlocked together during operation to prevent the escape of steam from the lower vessel 12. The interlocking engagement of the lower vessel 12 and the upper vessel 14 is achieved by the twisting of the vessels with respect to each other. The vessels are released from engagement by the twisting of the two vessels in a direction opposite to the direction of twist employed to lock them together.

Water may be introduced in the lower vessel 12 when the upper vessel 14 is removed from the lower vessel 12. After water has been introduced into the lower vessel 12, the upper vessel 14 and the lower vessel 12 are locked together. The lower vessel 12 has an electrical heating assembly 16 that is secured to the base of the water-containing section 13 of the lower vessel 12. Electrical input energy is supplied to the coffeemaker 10 through the electrical plug and cord 18. The container 20 for the coffee grounds is secured in place between the upper and lower vessels and the steam that is generated by heating of the water in the lower vessel 12 forces liquid up through the coffee percolate through the coffee container 20 and into the upper vessel 14.

After the water has been forced up into the upper vessel 14 leaving the lower vessel 12 and section 13 virtually empty, the heating assembly 16 causes the base of the section 13 of the lower vessel 12 to reach predetermined elevated temperature, at which time the thermostatic switch operates to open the electrical circuit including assembly 16. The upper vessel 14 and lower vessel 12 are formed of die cast metal having good heat conducting characteristics so that the heat produced by the heating assembly 16 is transmitted to the upper vessel 14 to keep the brewed coffee warm. The thermostatic switch cycles at a temperature such that with the lower vessel 12 empty, the brewed coffee in the upper vessel 14 is maintained at a substantially constant elevated temperature.

The line cord 18 may be removed from the coffeemaker by removal of the female plug 22 from the heating assembly 16 when serving the coffee that is prepared in the coffeemaker 10. An insulated handle 24, which is preferably formed of plastic, is provided to lift the entire coffeemaker 10 in order to pour the coffee percolate through the spout 26 into a cup. The plastic handle 24 is secured to the upper vessel 14 by means of screws 62 and 64 which are screwed into corresponding threaded portions of the upper vessel 14. A cover 28 for the upper vessel 14 fits into the upper vessel 14 and is provided with a handle or knob 30 to permit access to the interior of the upper vessel 14.

The structure by means of which the upper vessel 14 and the lower vessel 12 are interlocked together is shown in FIG. 2. The lower vessel 12, which is supported on the legs 32, has an upper circular rim portion 36 which surrounds the interior opening to the lower vessel 12. Extending outwardly of the circular rim 36 are interlocking ledges 38 and 40 which have inclined surfaces 42 and 44 respectively. The upper vessel 14 similarly has a pair of locking ledges 46 and 48 which are also provided with corresponding mating inclined surfaces 50 and 52 for providing frictional engagement with the surfaces 42 and 44. The surfaces 42, 44, 50 and 52 are inclined so that when the two vessels are rotated in one direction relative to each other the vessels 12 and 14 will be locked together and when the two vessels are rotated in the opposite relative direction the two vessels will be released from engagement.

The underside of the upper vessel 14 is provided with a perforated circular filter disc 54 which is surrounded by a sealing gasket 55. The sealing gasket is received in an inwardly facing annular groove in vessel 14 (see FIG. 3) whereby the filter disc 54 and the gasket 55 are retained in assembled relation to the upper vessel 14 during normal usage but are easily dissambled for washing purposes. The filter disc 54 serves as a filter enclosure over the coffee container 20 and prevents the coffee grounds from being carried up into the upper vessel 14 by the coffee percolate as it is forced from the lower vessel 12 to the upper vessel 14. The locking action of the ledges 38, 40, 46 and 48 causes the gasket 55 to be clamped between the vessels 12 and 14 providing an effective seal. The upper lip 56 of the coffee basket 20 is sloped upwardly and it abuts against the sloping ledge 57 of the rim 36 of the lower vessel 12 when the coffeemaker 10 is assembled.

The upper vessel 14 has a centrally located percolator funnel 58 which is integrally formed the base of the upper vessel 14. A semi-circular downwardly sloping slot 60 is provided in the upper portion of the funnel to allow for passage of the coffee percolate from the funnel 58 into the interior of the upper vessel 14 for storage.

The coffee container 20 has a cylindrical side wall 78, a funnel-shaped surface 70 extending from the side wall 78 and a hollow pipe 66 extending downwardly from the surface 70 for receiving heated water from the lower vessel 12. A removable lower filter disc 68 is provided for the coffee container 20. The filter disc 68 is secured in place over the funnel-shaped surface 70 of the coffee container 20. The filter disc 68 is provided with a centrally located upstanding handle 72 and with one or more notches 74 on its outer periphery. One or more corresponding lugs 76, extend inwardly from the side wall 78 of the coffee container 20. The filter disc 68 may then be removed by twisting the handle 72 so that the slot 74 and the lug 76 are in alignment, when it is desired to clean the surface 70 of the coffee container 20. It has been found that if the surface 70 is not periodically cleaned that an undesirable accumulation tends to build up on this surface which may adversely affect the flavor of the coffee made in the coffeemaker 10.

The cross sectional views of FIG. 3 and 4 show the heating assembly 16 in detail. The female plug 22 which conducts electrical energy to the heating assembly 16 is inserted into the opening 80 in the heating assembly 16 to receive the male connecting terminals 82. The heating assembly housing 84 is preferably formed of a plastic which provides heat insulation from the hot base portion 86 of the lower vessel 12 so that the coffeemaker may be placed on various heat sensitive surfaces that are found in a house or office on which a hot coffeemaker could not be placed.

The housing 84 for the heating assembly 16 has a notched annular surface 88 which receives the bottom edge of the annular downwardly extending rim 90 of the lower vessel 12. A metallic mounting post 92, which is threaded on both of its ends is cast into the mounting boss 94 on the base 86. A mounting nut 95 and an associated washer 96 are provided for the lower threaded end of the mounting post 92 to secure the housing 84 in place. The nut 95 is recessed in the indention 98 in the base 100 of the housing 84 to prevent marring of the surface on which the coffeemaker is placed. The male connecting terminals 82 are held in place by U-shaped receiving sockets 102 that are formed integrally with the base 100 of the housing 84.

In order to provide for uniform and accurate heating of the coffeemaker 10, a C-shaped heating element 104 is molded integrally with the base 86. The heating element 104 is preferably of the well-known sheath type. It may be formed of a high resistance wire 106 which is surrounded by compacted electrically insulating powder such as fused magnesium oxide 108. The magnesium oxide 108 is enclosed in a tubular steel sheath 109 which is formed to a circular or C-shaped configuration and cast into a rib projecting from the die cast lower vessel 12. The coiled C-shaped heating resistance wire 106 is preferably a resistance wire that is sold under the trademark "Nichrome." The C-shaped heating element 104 is positioned so that it encircles the centrally located boss 94 with a radius sufficient to allow for the positioning of the control thermostat 110 in contact with the underside of the base 86 intermediate the inner periphery 112 of the rib enclosing the heating element 104 and the outer periphery 114 of the boss 94.

In the described embodiment, the thermostatic switch 110 has an elliptical mounting plate 111 with the holes 113 and 115 provided therein for receiving the mounting screws 117 and 119. Mounting posts 118 for receiving the screws 117 and 119 are provided which may be formed integrally with the base 196 or they may be removably positioned thereon. The screws 117 and 119 are received into corresponding threaded portions of the base 86 in such a manner that the mounting screws do not project through the base 86 into the water-containing section 13. This is to insure that the lower vessel 12 remains completely sealed and that the accumulation of deposits in the water-containing section 13 is minimized.

Electrical connection is made to the connectors 120 of the thermostatic switch 110 by means of the electrical leads 122, 124 and 126. As shown in FIG. 4 these connections provide a current path such that the heating element 104 is connected in series with the normally closed switch 110. By placing the thermostatic switch 110 intermediate the boss 94 and the heating element 104 an accurate measurement of the temperature of the base 86 may be achieved. The placing the switch 110 near the heating element 104 insures quick response. When the temperature of the coffeemaker reaches a predetermined temperature the switch 110 opens the heating circuit, and the coffeemaker 10 cools off. However, the switch 110 will again close when the temperature has decreased to a lower predetermined temperature. The temperature of the base 86 will thereafter cycle within a predetermined temperature range thereby keeping the contents of the coffeemaker 10 warm. The thermostatic switch 110 also protects the coffeemaker 10 from over-heating when insufficient water is in the lower vessel 12.

A conventional safety valve 128 is also provided in the lower vessel 12 to release steam pressure when the steam pressure in the lower vessel 12 reaches a predetermined value. The coffeemaker of the present invention is able to operate at relatively low steam pressures and to utilize a relatively low pressure safety valve because the coffee container 20 has a relatively large diameter and the coffee grounds in the coffee container 20 are rather loosely packed, which allows for relatively free passage of heated water from the lower vessel 12 to the upper vessel 14.

During operation of the coffeemaker of the present invention the steam pressure in the lower vessel 12 preferably builds up to approximately 50 p.s.i. The safety valve 128 is preferably designed to actuate at a pressure of 90–100 p.s.i. Thus the relief pressure of the pressure valve 128 of the coffeemaker 10 in the preferred embodiment of the present invention may be below the operating pressure of many conventional coffeemakers of the described type thereby providing an added safety feature for the coffeemaker 10 of the present invention.

As will be evident from the description presented above, the coffeemaker embodying the invention is extremely simple in structure and design while at the same time having functional advantages heretofore unknown in the art. Although utilizing a single electrical heating element 104 and a simple normally closed thermostatic switch 110, applicants have provided a coffeemaker which automatically brews expresso type coffee and later maintains it warm at a drinkable temperature without the use of any secondary heating elements, keep warm thermostats or the like which are normally necessary to accomplish these functions.

The die cast construction of the lower vessel 12 with the sheathed heating element 104 cast integrally therewith provides an arrangement in which the heating element 104 may quickly and efficiently heat the water in the lower vessel 12 during the brewing operation. As the steam generated within the lower vessel 12 forces the water through the coffee ground container 20 upwardly through the funnel 58 into the upper vessel 14, the heat from the element 104 is transmitted through the die cast walls of the lower vessel 12 to the upper vessel 14 thereby warming the upper vessel 14 within which the brewed coffee is received. Although there is some heating loss in conducting the heat to the upper vessel 14, frictionally engaged interlocking ledges 38, 40, 46 and 48 provide a good path for heat conduction into the die cast upper vessel 14.

Following transfer of the heated water from the lower vessel 12 to the upper vessel 14 through the coffee grounds in the coffee container 20, the lower vessel 12 begins to heat up rapidly because of the absence of any substantial amount of water in it. Without water, the lower vessel 12 would soon become overheated if the electrical power were continuously supplied to the heating element 104. In order to protect the coffeemaker from damage the thermostat 110 opens the heating element circuit to the heating element 104 when the base 86 of the lower vessel 12 rises to approximately 305°F.

In the present coffeemaker, it is also desired to maintain the coffee liquor that is present in the upper vessel 14 at a drinkable temperature after it has been transferred into the upper vessel. The single thermostat 110 also accomplishes this purpose by closing the heating circuit when the temperature of the base 86 of the lower vessel 12 falls to approximately 255° F. The side walls of both the lower vessel 12 and the upper vessel 14 and the locking ledges 38, 40, 46 and 48 are formed of fairly thick die cast aluminum. The side walls of the lower vessel 12 and the upper vessel 14, for example, have a minimum thickness of at least 0.115 inches. As a result, adequate heat conduction is achieved from the heating element 104, through the base 86, the side wall of the lower vessel 12, the locking ledges 38, 40, 46 and 48, and the side wall of the upper vessel 14 to the coffee liquor that is stored in the upper vessel 14 to maintain the coffee liquor at a drinkable temperature after it has been prepared. The thermostat 110 continues to cycle on and off continuously in a manner such that the temperature of the base 86 is held to a maximum temperature of approximately 305° F and is not allowed to fall below a minimum temperature of approximately 255° F. The temperature of the brewed coffee in the vessel 14 will then remain at approximately 190° F while the coffeemaker is coupled to a supply of electrical energy and the thermostat 110 cycles to keep the base 86 within the above-noted temperature range.

While there has been shown and described a single embodiment of the present invention, it will be apparent to those skilled in the art that numerous changes and modifications may occur, and it is intended in the appended claims to cover all such changes and modifications which fall within the true spirit and scope of the present invention.

What is claimed as new and desired to be secured by Letters Patent of the United States is:

1. An electric coffeemaker comprising a lower vessel including a section in which water may be contained, said water-containing section comprising a base having a heating element integrally molded therein, an upper vessel which is releasably secured to said lower vessel, said upper vessel having a pouring spout and a coffee percolate supply means for supplying the coffee percolate to the upper vessel for storage, electrical means including an electrical connector for supplying electrical energy to said heating element, a coffee ground container comprising a hollow pipe-like structure for supplying water from the lower vessel through the coffee grounds in the coffee ground container and into the upper vessel and thermostatic switch means connected in series with said heating element and position in contact with the underside of said base of said water-containing section, said lower vessel and said upper vessel providing good heat conduction between said heating element and the contents of said upper vessel, said thermostatic switch means constructed to provide overload protection for said coffeemaker and to keep the temperature of the contents of said upper vessel substantially within a predetermined temperature range by the cyclic operation of said heating element.

2. An electric coffeemaker comprising a lower vessel including a section in which water may be contained, said water-containing section comprising a base having a heating element integrally molded therein, an upper vessel which is releasably secured to said lower vessel, said upper vessel having a pouring spout and a coffee percolate supply means for supplying the coffee percolate to the upper vessel for storage, electrical means including an electrical connector for supplying electrical energy to said heating element, a coffee ground container comprising a hollow pipe-like structure for supplying water from the lower vessel through the coffee grounds in the coffee ground container and into the upper vessel and thermostatic switch means connected in series with said heating element and positioned in contact with the underside of said base of said water-containing section, said thermostatic switch means constructed to provide overload protection for said coffeemaker and to keep the temperature of the contents of said upper vessel substantially within a predetermined temperature range, said thermostatic switch means comprising a thermostatic switch mounting means for holding said thermostatic switch against the underside of said base of said water-containing section of said lower vessel, threaded holes in the underside of said base of said lower vessel which do not extend through said base and securing means in contact with said mounting means and screwed into said threaded holes for securing said thermostatic switch means against said base to said water-containing portion.

3. The coffeemaker of claim 2 wherein the coffee ground containing means comprises a cylindrical wall, a funnel-shaped section that slopes downwardly from the lower end of said cylindrical wall and a hollow pipe that extends downwardly from an aperture at the center of said funnel-shaped section for supplying water to coffee grounds in said coffee ground container, said coffee ground container also comprising at least one inwardly projecting ridge and a removable circular filter disc comprising a notch on its outer periphery, said filter disc also comprising an upwardly projecting handle, said notch on said disc and said ridge being related to that rotation of said filter disc by manipulation of said handle so as to provide for alignment of said notch and said ridge allows said filter disc to be removed from said coffee ground container when it is desired to clean said funnel-shaped section.

4. An electric coffeemaker comprising a lower vessel including a section in which water may be contained, said water-containing section comprising a base having a heating element integrally molded therein, an upper vessel which is releasably secured to said lower vessel, said upper vessel having a pouring spout and a coffee percolate supply means for supplying the coffee percolate to the upper vessel for storage, electrical means including an electrical connector for supplying electrical energy to said heating element, a coffee ground container comprising a hollow pipe-like structure for supplying water from the lower vessel through the coffee grounds in the coffee ground container and into the upper vessel and thermostatic switch means connected in series with said heating element and positioned in contact with the underside of said base of said water-containing section, said thermostatic switch means constructed to provide overload protection for said coffeemaker and to keep the temperature of the contents of said upper vessel substantially within a predetermined temperature range, said electrical connector and said thermostatic switch means being enclosed by a plastic housing member which comprises the base surface of the coffeemaker, said base surface having an aperture therein, and means for securing said plastic housing member to the lower vessel of the coffeemaker comprising a downwardly extending threaded boss at the center of said base of said water-containing section, an elongated rod threaded at both ends, one end of said rod being secured to said downwardly-extending boss and the other end of said rod projecting through said aperture in said base surface and securing means on said projecting end of said rod for securing said base on said coffeemaker.

5. The coffeemaker of claim 4 wherein said heating element is C-shaped and said thermostatic switch is mounted intermediate the outer periphery of said downwardly extending boss and the inner periphery of said C-shaped heating element.

6. The coffeemaker of claim 4 wherein said lower vessel has a downwardly extending annular rim and said plastic housing member has an upwardly extending annular notched surface a portion of which abuts the lower surface of said annular rim.

7. The coffeemaker of claim 4 wherein the coffee ground containing means comprises a cylindrical wall, a funnel-shaped section that slopes downwardly from the lower end of said cylindrical wall and a hollow pipe that extends downwardly from an aperture at the center of said funnel-shaped section for supplying water to coffee grounds in said coffee ground container, said coffee ground container also comprising at least one inwardly projecting ridge and a removable circular filter disc comprising a notch on its outer periphery, said filter disc also comprising an upwardly projecting handle, said notch on said disc and said ridge being related so that rotation of said filter disc by manipulation of said handle so as to provide for alignment of said notch and said ridge allows said filter disc to be removed from said coffee ground container when it is desired to clean said funnel-shaped section.

8. An electric coffeemaker comprising upper and lower die cast vessels for receiving brewed coffee and water respectively, coupling means on the top of said lower vessel and the bottom of said upper vessel for locking said vessels together in sealed engagement, a brewed coffee delivery tube in said upper vessel communicating with the top of said lower vessel and the top of said upper vessel, a coffee ground container positioned in said lower vessel in obstructing relation to said delivery tube and having a water entry tube which extends to the bottom of said lower vessel whereby water may be forced by pressure through the coffee grounds in said container through said delivery tube into said upper vessel, a heating element in good heat transfer relation with the bottom of said lower vessel, a normally closed thermostatic switch mounted on said bottom and electrically connected in series with said heating element, said thermostatic switch bein constructed to be operative so as to electrically open the current path for said heating element at an elevated temperature after the water in said lower vessel has been forced into said upper vessel, and so as to thereafter repeatedly electrically open and close said current path for said heating element so that the brewed coffee in said upper vessel is kept warm by the cyclic operation of said heating element.

9. The coffeemaker of claim 8 wherein said upper and lower vessels and said coupling means are constructed to provide good heat transfer between said heating element and said upper vessel whereby said heating element supplies an appropriate amount of heat to maintain the brewed coffee in said upper vessel at an elevated temperature when said lower vessel is empty of water and said thermostatic switch is cycling.

10. The coffeemaker of claim 9 wherein said upper and lower vessels are cylindrical aluminum vessels that have a wall thickness of at least 0.115 inches.

11. The coffeemaker of claim 9 wherein said coupling means comprises peripherally extending, interlocking ledges are integrally formed on said upper vessel and said lower vessel, said upper vessel ledges and said lower vessel ledges being constructed to engage each other over substantial areas thereof so as to facilitate heat transfer from said lower vessel to said upper vessel.

* * * * *